US005494708A

United States Patent [19]
Chess, Jr.

[11] Patent Number: 5,494,708
[45] Date of Patent: Feb. 27, 1996

[54] METHOD AND APPARATUS FOR MIXING, SPRAYING AND PLACING CEMENTITIOUS MATERIALS

[75] Inventor: Henry L. Chess, Jr., Minneapolis, Minn.

[73] Assignee: Blue Oak Materials Limited Partnership, Waltham, Mass.

[21] Appl. No.: 261,927

[22] Filed: Jun. 17, 1994

[51] Int. Cl.$^6$ ................................................. B05D 1/02
[52] U.S. Cl. ......................... 427/421; 427/426; 427/427
[58] Field of Search ................................. 264/12, 13, 14; 427/426, 427, 421; 106/690, 691; 118/300, 313, 314, 315, 310, 311

[56] References Cited

U.S. PATENT DOCUMENTS

| | | | |
|---|---|---|---|
| 1,549,277 | 8/1925 | Stevens | 118/300 |
| 4,355,060 | 10/1982 | Cornwell | 427/427 |
| 4,390,371 | 6/1983 | Cornwell . | |
| 4,708,745 | 11/1987 | Schonhausen | 427/427 |

OTHER PUBLICATIONS

"Insulspray" Brochure, Weather Products Company (1961) No month given.

*Primary Examiner*—Paul Marcantoni
*Attorney, Agent, or Firm*—William C. Geary, III; Lahive & Cockfield

[57] ABSTRACT

There is provided an improved composition for rapid setting, sprayable cementitious material, as well as improved processes and systems for mixing and placing such materials. The composition comprises a sprayable mixture of cement forming ingredients, such as silicon dioxide, magnesium oxide, and an aqueous metal phosphate solution. The process for mixing and placing such a composition uses serially connected dry material feed receptacles which are independently pressurizable and are isolatable from ambient conditions after loading to provide substantially increased throughput volume. The receptacles communicate the composition to a fluidizing element in which the material is fluidized before being formed into a slurry and atomized. Alternatively, dry and slurried material can be conveyed in a cavity pump under high pressure to achieve substantially increased throughput volume.

11 Claims, 2 Drawing Sheets

METHOD AND APPARATUS FOR MIXING, SPRAYING AND PLACING CEMENTITIOUS MATERIALS

BACKGROUND OF THE INVENTION

This invention relates to sprayable, rapid setting cementitious materials and to methods of making and applying such materials.

Cementitious materials are used extensively in the construction industry as pavements and/or surface coatings for infrastructures such as roadways, swimming pools, bridges, walls, tunnels and other structures which are exposed to the elements and/or to repeated heavy use. Many applications require rapid curing of the cementitious materials.

In a typical cement making and placing process, dry materials are added to a mixing chamber through an open hopper, to which additional dry material is fed as needed to maintain a continuous process. A pressurized gas stream, such as compressed air, is introduced into the mixing chamber to aerate, tumble and convey the dry materials through the mixing chamber. The gas stream is also used to blend a liquid component, also introduced under pressure, with the dry materials to form a slurry. The gas stream is typically introduced and maintained at a relatively low pressure (i.e., up to about 15 psi) through the use of various constricting devices, such as static mixers, venturi eductors and transvectors.

One technical problem that must be overcome is to avoid constriction of the mixing device. If constriction is excessive, the dry materials can be blown back into the material hopper, causing hazardous dusting conditions. Further, inadequate gas stream pressure can cause the slurry to clog the mixing equipment and impede movement of the slurry through the mixing chamber. Attempts to force the material through the dispensing equipment by increasing the gas stream pressure can fail from an inability to maintain sufficient pressure in the mixing chamber when it is open to ambient conditions.

U.S. Pat. No. 4,355,060 to Cornwell discloses a high temperature cementitious material comprising a mixture of magnesium oxide, fly ash, finely divided mineral aggregates and aqueous ammonium phosphate solutions. Cementitious material compositions which include ammonium phosphates, such as the composition disclosed in Cornwell '060, are characterized by an offensive odor that is produced during cure of the material and the resulting release of ammonia.

U.S. Pat. No. 4,390,371 to Cornwell discloses a method for mixing, spraying and placing such a cementitious material. The method uses static in-line mixers and an open hopper to hold blended dry material. The material is then transported with compressed air to the static mixing system, for example, by using a transvector or a venturi eductor.

Specialized equipment is necessary to make and place rapid setting, sprayable cementitious materials. In particular, the use of static in-line mixers for preparing and placing such materials can be problematic. Rapid setting compositions require faster mixing and faster transport through mixing and spraying equipment in order to avoid curing and hardening of the material while it is still in the equipment. Thus, these compositions must be mixed and moved through the equipment at relatively greater speeds and under relatively greater fluid pressures. Conventional cement mixing equipment is not designed to accommodate the increased fluid pressures required to mix and place these rapid setting compositions. For example, the use of air pressures greater than about 15 pounds per square inch (psi) in conventional processing equipment can cause problems such as leakage and mechanical seals, uncontrolled dusting of the dry ingredients, tunneling of compressed air through slurries and dry ingredients, and clogging of hoses with slurry or dry ingredients that are not adequately mixed or transported in the fluid stream. Further, the addition of fibrous reinforcing material, such as fiberglass, as a dry ingredient results in flocking or fluffing of the fiberglass within the static mixer and other interstices of the equipment. The result is incomplete mixing of the material and, consequently, nonuniformity and reduced strength of the final product.

The use of conventional air pressures to mix and place rapid setting cementitious compositions does not sufficiently propel either the dry material through the mixing equipment or the slurried material through a constricting device for satisfactory placement of the material. Further, only objects which are located immediately adjacent to the constricting device can be spray-coated using conventional air pressures.

It is therefore an object of the invention to provide an improved system for preparing and dispensing rapid setting cementitious materials. It is a further object of the invention to provide an improved rapid setting cementitious composition. Another object of the invention is to provide an apparatus for making and placing rapid setting cementitious materials. These and other objects will be apparent from the description which follows.

SUMMARY OF THE INVENTION

The invention relates to rapid setting cementitious materials and methods of making and placing such materials. In one aspect of the invention, there is provided a composition for a rapid setting, sprayable cementitious material. The composition comprises up to about 200 parts by weight silicon dioxide, up to about 50 parts by weight magnesium oxide, and approximately 10 to 150 parts by weight of an aqueous monometal phosphate solution.

The composition can further include up to about 200 parts by weight of at least one metallic oxide selected from the group consisting of the oxides of calcium, aluminum, iron, potassium, titanium and sodium, up to about 50 parts by weight calcium carbonate, and up to about 30 parts by weight of preselected lengths of binderless fiberglass fibers, can be added with the dry component.

The aqueous monometal phosphate solutions are selected for their ability to promote a rapid cure without releasing ammonia. They can include, for example, monoaluminum phosphate, monomagnesium phosphate and monocalcium phosphate.

In another aspect of the invention, there is provided a continuous process for making a rapid setting, sprayable cementitious material. The dry materials described above are added to a first receptacle which is controllably connected with and disposed upstream of a second receptacle. During loading of the dry material, the first receptacle is open to ambient conditions and is isolated from the second receptacle. The second receptacle is fluidically connected with a fluidizing element, in which a pressurized gas fluidizing stream establishes the pressure of the first and second receptacles during the process.

After the dry material is loaded into the first receptacle, the first receptacle is isolated from ambient conditions and then opened to the second receptacle to permit equilibration of the pressures within the two receptacles and to permit the transfer of the dry material from the first receptacle to the second receptacle. The dry material in the second receptacle is then continuously transferred to a fluidizing conduit in which it is fluidized in a pressurized gas stream introduced via a gas entry port in the fluidizing conduit. The fluidized material is transported to an impingement element which is disposed downstream of the fluidizing element. An aqueous phosphate solution is then introduced under pressure to the fluidized material in the fluidizing element just upstream of the impingement element. The aqueous phosphate solution combines with the dry component in the impingement element to form a slurry. The slurry is then atomized through a constricting element which is disposed downstream of the impingement element to yield a sprayable, rapid setting cementitious material.

In another aspect of the invention, there is provided an alternative continuous process for making a sprayable, rapid setting cementitious material. In this process, a dry component as described above is introduced to an inlet port of a cavity pump. During pump operation the dry component is mixed and transported through the pump. About 10 to 150 parts by weight of an aqueous phosphate solution is then introduced under pressure into a portion of the dry component in an interior chamber of the cavity pump to form a slurry. The slurry is mixed and atomized to form a sprayable, rapid setting cementitious material.

According to another aspect of the invention, there is provided a material mixing and dispensing system for continuously making and dispensing a rapid setting sprayable cementitious material. The system includes at least one paired first and second receptacle, the first receptacle being controllably connected with and disposed upstream of the second receptacle. The paired first and second receptacles are independently pressurizable by introduction of a pressurized gas thereto. The second receptable communicates with a fluidizing element in which the dry material is fluidized and transported in a pressurized gas stream. The fluidizing element includes a conduit, a gas entry port for introducing a fluidizing stream, and a liquid entry port for introducing a pressurized liquid. The system further includes an impingement element disposed downstream of the fluidizing element for mixing the dry material with the liquid to form a slurry, and a constricting element for dispersing the slurry to obtain a sprayable cementitious material.

In one embodiment, the paired first and second receptacles are individual hoppers. In an alternative embodiment, the paired first and second receptacles are formed of portions of a single flexible conduit, each conduit comprising separable first and second receptacles. Preferably this embodiment involves the use of several adjacent conduits that communicate at a downstream portion thereof with a common fluidizing conduit.

The gas entry port in the fluidizing conduit is preferably disposed in an upstream portion of the fluidizing conduit. The liquid entry port in the fluidizing conduit is typically located downstream from the gas entry port.

In one embodiment the impingement element comprises a static mixer, in which the slurry is mixed prior to atomization. In an alternative embodiment, the impingement element comprises a separate nozzle or similar constricting device which creates turbulence in the slurry, thereby mixing it prior to atomization.

The constricting or atomizing element can be in the form of a single nozzle through which the slurry passes under pressure to be atomized. Alternatively, the constricting element can further include a separate air jet which impinges on the atomized cementitious material exiting the nozzle to further atomize the material.

The material mixing and dispensing system can further include a chopper unit disposed downstream of the constricting element for chopping fiberglass roving into preselected lengths. An auxiliary air jet disposed between the chopper unit and the constricting element fluidizes the chopped fiberglass roving and disperses it into the atomized cementitious material.

The term "cementitious material", as used herein, refers to any composition comprising a mixture of a dry component, which can include relatively fine active ingredients and relatively coarse inactive ingredients, and a liquid component which reacts with the active dry ingredients to form a concrete-type material which, when fully cured, is extremely durable and resistant to thermal and mechanical stresses and to attack by corrosion, moisture and chemicals. The term "rapid setting", as used herein, refers to the ability of the material to undergo a rapid reaction upon contact of the active ingredients with the liquid component to form a material which is substantially cured within one to several minutes. The term "sprayable", as used herein, refers to the ability of the material, prior to full cure, to be atomized under pressure through a constricting device and to be sprayed onto a desired substrate. The terms "isolatable" or "isolated", as used herein, refer to vessels which are sealable or sealed, respectively, to prevent loss of fluid, whether gas, liquid or even powdered solid material.

BRIEF DESCRIPTION OF THE DRAWINGS

For a fuller understanding of the nature and objects of the invention, reference should be made to the following detailed description and the accompanying drawings, in which:

FIG. 1 is a schematic diagram of a material mixing and dispensing system used in a continuous process for making a sprayable, rapid setting cementitious material according to one embodiment of the invention;

FIGS. 2 and 3 are schematic diagrams of alternative systems and processes for making a sprayable, rapid setting cementitious material according to the invention; and FIG. 4 is a schematic illustration of the operation of the dry material feed portion of the material mixing and dispensing system illustrated in FIG. 1.

DETAILED DESCRIPTION OF THE INVENTION

The invention provides, inter alia, an improved composition for a rapid setting, sprayable cementitious material. The composition comprises a dry component which can include active and inactive dry ingredients, and a liquid component comprising an aqueous metal phosphate solution. The term "active", as used herein, refers to an ingredient of a cementitious material which reacts exothermically to cure the material. Active ingredients are generally fine particles which easily pass through a 100 mesh screen. The term "inactive", as used herein, refers to an ingredient in a cementitious material which is not essential to the curing reaction but instead acts as a filler or aggregate. Inactive ingredients are generally relatively coarse materials having a particle size greater than 100 mesh.

The active ingredients include calcium carbonate and one or more metallic oxides selected from the group consisting of the oxides of calcium, aluminum, iron, potassium, titanium and sodium. The inactive ingredients include silicon dioxide and, optionally, fiberglass fibers.

The silicon dioxide is added in an amount of up to about 200 parts by weight of the mixture. It can be in the form of a flour, a powder, a coarse sand, and/or a relatively large aggregate. The particle size and purity of the silicon dioxide can vary widely, i.e., from less than 325 mesh (0.0017 inch) to pea gravel (¼"), depending on the desired characteristics of the resulting cementitious material. Silicon dioxide is generally added in the form of relatively coarse sand, i.e., well over 100 mesh in particle size. Silicon dioxide is commercially available from a number of sources, including U.S. Silica (Berkeley Springs, W.Va.).

Magnesium oxide is an essential active ingredient which is added in an amount of up to about 50 parts by weight to promote a rapid cure. It is generally well under 100 mesh in particle size. Magnesium oxide can be obtained, for example, from Martin Marietta (Hunt Valley, Md.).

The metallic oxides typically are added in a total amount of up to about 200 parts by weight. They are active ingredients and are generally well below 100 mesh in particle size. The metallic oxides are commonly found in virtually every type of naturally occurring rock, sand and/or mineral. The presence, relative amounts and particle sizes of the various metallic oxides will depend ultimately on the desired cure and strength characteristics or the resulting cementitious material. For example, calcium oxide, which slows the cure, can be added in amounts of up to 50 parts by weight. Aluminum oxide can be added in amounts of up to about 100 parts by weight, and the remaining oxides can each be added in amounts of up to about 10 parts by weight. These metallic oxides are available commercially from many chemical suppliers, and one of ordinary skill in the art will readily understand the metal oxides and quantities or metal oxides to be used to impart desired properties.

Calcium carbonate is an active ingredient which is added in an amount of up to about 50 parts by weight. It promotes frothing of the resulting cementitious material, thereby increasing porosity and reducing weight. The calcium carbonate is generally well below 100 mesh in particle size and can be obtained, for example, from ECC America (Sylacauga, Ala.).

Optionally, up to about 30 parts by weight of precut lengths of binderless fiberglass fibers can be added. The term "binderless", as used herein, refers to the absence of any organic binder, such as silane, in the fiberglass stranding.

The presence of short fiberglass fibers in the cementitious material increases the strength of the cementitious material without significantly increasing the weight per unit volume of the material. Binderless fiberglass fibers are commercially supplied in relatively short lengths (i.e., less than one inch long and preferably from ¼" to ½") and can be added with the dry component. Binderless fiberglass is available, for example, from PPG Industries or from Owens Corning.

The liquid component comprises about 10 to 150 parts by weight of an aqueous metal phosphate solution. Aqueous metal phosphate solutions are believed to produce a stronger cementitious material than is obtained when ammonium phosphate is used as the liquid component. Further, although water itself can be used as the liquid component in making cementitious materials, the rapid setting characteristic of this material requires the use of an aqueous phosphate solution as the liquid component. The metal phosphate solutions used with the present invention are environmentally acceptable in virtually all cement-making processes due to their aqueous nature. A further advantage is that they do not release noxious fumes during the reaction with the active dry ingredients.

Exemplary metal phosphates include monoaluminum phosphate, monomagnesium phosphate and monocalcium phosphate, in which the metal phosphate is present at about 50% concentration. It can be obtained by reducing a metal polyphosphate powder to a monometal phosphate in an aqueous phosphoric acid solution. Suitable metal phosphate solutions are also commercially available from Albright & Wilson (Richmond, Va.). Aqueous monoaluminum phosphate is currently the preferred liquid component.

The invention further provides improved processes for making rapid setting cementitious materials which can be sprayed onto a variety of substrates. In one embodiment, the process employs serially arranged and controllably connected first and second receptacles which are isolatable from ambient conditions and which are also independently pressurizable. Such receptacles permit continuous dry material transfer at pressures substantially in excess of the pressures attainable when rotary airlock valves are used according to previously known techniques.

According to the process of the invention, the first receptacle is filled with a dry material as previously described. During loading of the dry material into the first receptacle, the second receptacle, which is pressurized to a selected uniform pressure, is isolated from the first receptacle. After the first receptacle has been fully loaded with dry material, it is selectively isolated from ambient conditions and is selectively opened to the second receptacle to permit the two receptacles to equilibrate. The dry material is thus transferred from the first receptacle into the second receptacle by gravity flow through a rotary valve or other conventional metering device.

The second receptacle is serially connected to a fluidizing element which includes a conduit and a port or jet for introducing a pressurized gas to fluidize the dry material and establish the pressures of the first and second receptacles. The dry material is allowed to flow by gravity feed, in amounts controlled by a metering device, from the second receptacle into the fluidizing element where it is fluidized in a pressurized gas stream. The fluidized dry material is then transported to an impingement element disposed downstream of and connected with the fluidizing element.

An aqueous phosphate solution as described above is then introduced under pressure into the fluidized dry material in the fluidizing element upstream of the impingement element. The liquid solution typically is introduced at a pressure of approximately 50 to 70 psi (absolute), or preferably about 15–20 psi greater than the pressure of the fluidizing stream. The force of the incoming liquid stream, combined with the turbulence of the fluidized dry materials in the fluidizing stream, causes mixing of the dry and liquid components in the impingement element to form a slurry. The slurry is transported through the impingement element at a selected pressure, typically between 30 and 50 psi, to a constricting element, such as a nozzle or other reduced diameter orifice, to be atomized and dispensed in a spray.

In a preferred embodiment air is the fluidizing vehicle. However, other gases can be used, especially if one or more properties of the gas used are beneficial to stabilize or slow the reaction between the dry and liquid components to permit the material to pass completely through the equipment before curing begins. Examples of such gases include carbon dioxide, argon and nitrogen.

The reaction between the dry and liquid components used to form the cementitious material is exothermic. The heat released during the reaction can be dissipated or cooled by employing a cooled gas stream. Alternatively, the gas can be introduced at room temperature.

The first and second receptacles can be individual units, such as conventional bins or hoppers, which are isolatable from each other and from ambient conditions via sealable valves or lidded ports. The bins or hoppers can be of any conventional type which meet the applicable industry standards for safety, design and construction. The dimensions of the bins will be determined by space limitations and the desired volume of material to be produced.

In one embodiment, the controllable valves between the receptacles and the fluidizing element can be, for example, conventional rotary airlock valves. The rotary valves in this instance function as simple metering devices because there is no pressure differential on either side of the valve, and thus no airlock. As a result there are no delivery pressure limitations imposed upon the rotary valves.

The fluidizing conduit is typically an air hose or other conduit into which the dry material flows by gravity feed and in which the dry material is fluidized in a pressurized gas stream. The fluidizing stream transports the dry material through the fluidizing conduit to the impingement element.

The impingement element can be, for example, a static mixer or similar device which includes stationary vanes arranged in a geometrical configuration against which a pressurized fluid or slurry impinges as it passes through the device. The force of the impinging fluid against the stationary vanes creates turbulent flow, thereby mixing the impinging fluid. Preferred static mixers include the KMA series six-element models available from Chemineer (N. Andover, Ma.).

Alternatively, the impingement element can be a nozzle or similar constricting device which also creates turbulent flow in a pressurized stream flowing through it. This type of constricting device contains neither stationary vanes nor moving parts. Instead, turbulent flow is created, and the fluid is mixed, when a pressurized fluid impinges against the interior walls of the constricting device which narrow to form the reduced diameter opening characteristic of such devices. Preferred constricting devices include nozzles and venturi tubes.

The constricting element can be a nozzle, venturi tube or other reduced diameter orifice. Commonly used nozzles have ½", ¾" and 1" orifices. Such constricting devices do not contain stationary vanes, as in static mixers, but instead impart turbulence to a material stream passing therethrough by causing the particles within the stream to impinge upon the narrowed walls of the constricting device.

The constricting element can be a single nozzle through which the cementitious material is dispensed. It can also include a separate air jet which impinges compressed air upon the atomized cementitious material at a preselected angle to further atomize the cementitious material. Such a separate air jet is typically arranged to deliver air to the atomized cementitious material at an absolute pressure of about 25 to 40 psi from one or more orifices. Preferably, this air jet is delivered at a relatively low angle of incidence (e.g., less than 45°) with respect to the output from the constricting element.

The liquid jet, static mixer and nozzles can all vary in diameter to meet the requirements of a particular material composition, viscosity, flow rate and spray pattern. Typically, the liquid jets range in size from 1/16" through 9/32". The static mixers can vary from ¾" diameter to 1½" diameter, and the nozzles can vary from ½" to 1". The most preferred combination of component sizes is a 7/64" liquid jet with a 1" diameter static mixer and a ¾" nozzle.

FIG. 1 illustrates schematically a material delivery device and process of the invention according to one embodiment thereof, in which first receptacle R1 is serially arranged and controllably connected with second receptacle R2. Receptacle R1 includes a hinged lid (not shown) for sealing the first receptacle from ambient conditions. A valve element V1 is disposed between the first and second receptacles R1, R2 for delivering dry material from R1 to R2. With valve element V1 closed and the lid to R1 open, dry material 10 is fed into the first receptacle R1. After the first receptacle R1 is filled with dry material 10, the hinged lid to R1 is closed, thereby isolating R1 from ambient conditions.

The second receptacle R2 is fluidically connected with fluidizing conduit C1 by means of a second valve element V2. The fluidizing conduit C1 includes means for introducing a fluidizing gas 20 thereto. Thus when valve element V2 is open the second receptacle R2 is at substantially the pressure of the gas 20 in the fluidizing conduit C1.

Valve element V1 is opened to permit transfer of the dry material 10 from the first receptacle R1 to the second receptacle R2. At this stage of the process the first receptacle R1, the second receptacle R2 and the fluidizing conduit C1 are all at substantially equal pressure, i.e., the pressure of the pressurized gas stream 20 in the fluidizing conduit C1. Thus, the dry material 10 flows by gravity feed from the first receptacle through valve element V1 and into the second receptacle R2. Similarly, the dry material 10 flows by gravity feed from the second receptacle R2 through valve element V2 and into the fluidizing conduit C1.

A pressurized gas stream 20 is introduced into the fluidizing conduit C1 to fluidize the dry material 10 and convey it through C1 to an impingement element M. A liquid 30, which can be an aqueous phosphate solution as previously described, is introduced under pressure through a jet to the fluidized dry material 20 in the fluidizing conduit C1 just upstream of the impingement element M. The liquid jet 30 impinges upon the fluidized dry material 10 and forms a slurry 40. The slurry 40 is transported through the impingement element M by the fluidizing gas stream 20 and is mixed by the impingement of the slurry 40 on the internal structure of the impingement element M. The slurry 40 then passes through a constricting element 50 to be dispersed as atomized cementitious material 45.

FIG. 1 also illustrates the addition of short lengths of chopped fiberglass roving 80 to the atomized cementitious material 45. Fiberglass roving is manufactured as a bundle of continuous fiberglass strands which are either bundled as parallel fibers or twisted to form a multi-ply strand. The diameter of a single fiberglass fiber is extremely small, i.e., on the order of a few ten-thousandths of an inch. Fiberglass roving can thus contain up to several thousand individual fiberglass strands which are bound together in parallel strands (roving) or in twisted strands (yarn). The fiberglass roving is bound with an organic binder, such as a silane or starch compound, to promote adherence of the fiberglass strands to one another and to other materials in the mixtures to which the roving or yarn is added.

The roving is typically added to the cementitious material relatively late in the cement making process, i.e., alter the slurry stage. The roving is typically chopped to a desired length, preferably in 1" to 3" lengths, by an in-line chopper unit and added either to the slurry or to the atomized cementitious material. In the embodiment shown in FIG. 1, the fiberglass roving 80 can be chopped into preselected lengths by a chopper unit 90, which is disposed downstream of the constricting element 50. The chopped fiberglass roving 80 can then be blown into the atomized cementitious material 45 in a pressurized air jet 22 from a suitably disposed separate nozzle 95.

Alternatively, individual fibers can be added to the atomized material in a similar manner.

Figure 4:
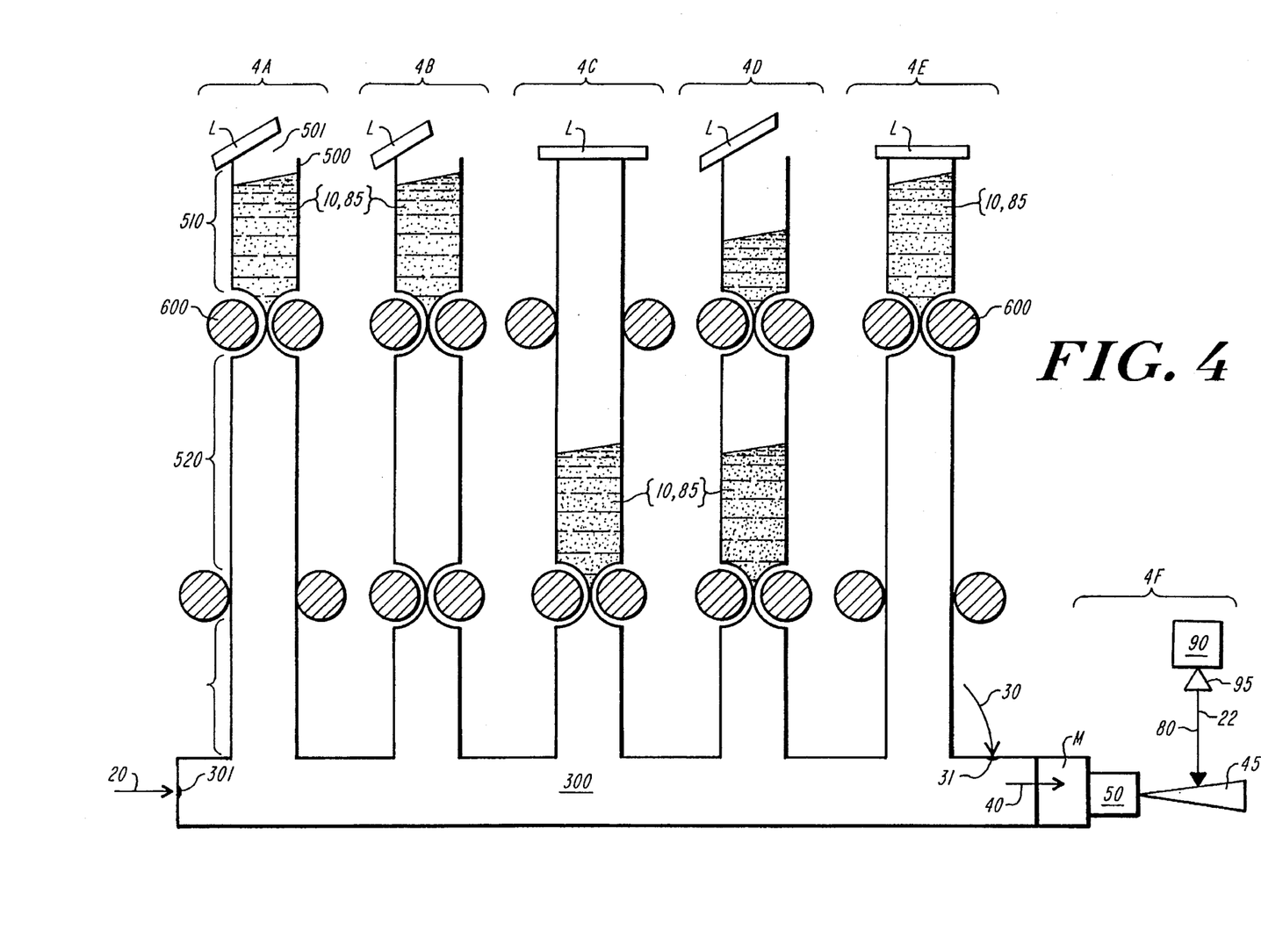

In another embodiment, the paired, isolatable first and second receptacles can be formed in separate portions of a single flexible conduit. Preferably, as illustrated in FIG. 4, several flexible conduits 500 are disposed adjacent to each other and in communication with a common fluidizing conduit 300. In this embodiment, the portions of flexible conduit can be isolated from one another with conventional means, such as a pneumatic or hydraulic tourniquet, or a mechanical pinching element, or other controllable sealing element.

As shown in FIG. 4, flexible conduit 500 includes an entry port 501, a hinged lid L movably disposed over the entry port, a first portion 510 (analogous to first receptacle R1), a second portion 520 downstream of the first portion (analogous to second receptacle R2), and an exit port 530 leading to a fluidizing conduit 300 (analogous to C1). The various portions of conduit 500 are separable and sealable from one another by selectively closable sealing elements 600 (analogous to valve elements V1 and V2). Sealing elements 600 can be in the form of pinch bars or other conventional devices which can be driven, for example, by mechanical, electrical, hydraulic or pneumatic controls. The sealing elements 600 effectively seal the first portion 510 from ambient conditions and also seal the second portion 520 from the fluidizing conduit 300. A typical flexible conduit can be made from, for example, flexible plastic tubing, and a typical pinch bar can be made from, for example, ¾" round bar stock.

Portion 4A of FIG. 4 shows the flexible conduit 500 with the upper pinch bars 600 closed, the lower pinch bars 600 open and the first portion 510 of the conduit full of dry material 10. At this stage of the process the first portion is open to ambient conditions and isolated from the downstream portions, which are pressurized to a selected uniform pressure by means of pressurized gas stream 20 flowing through the fluidizing conduit 300.

Portion 4B of FIG. 4 illustrates that the lower pinch bars 600 are closed in preparation for transfer of dry material 10 from the first portion 510 into the second portion 520. The second portion 520 is pressurized to the pressure of the pressurized gas stream 20 in the fluidizing conduit 300.

As shown in portion 4C of FIG. 4, the upper portion 510 has been isolated from ambient conditions by engagement of the lid L over the entry port 501. The upper pinch bars 600 are then opened to permit the first and second portions of the conduit to equilibrate and to permit the dry material 10 to flow by gravity into the second portion 520 of the conduit. At this stage of the process the first and second portions of the conduit are uniformly pressurized to the pressure of the pressurized gas in the fluidizing conduit 300.

In portion 4D of FIG. 4 the first portion 510 of the conduit is to be refilled with dry material 10. Hinged lid L is disengaged from the entry port, thereby opening the first portion 510 to ambient conditions. The upper pinch bars 600 are closed again so that the second portion 520 and the fluidizing conduit 300 remain at substantially equal pressures and are isolated from ambient conditions. Dry material 10 is then added to the first portion 510, and the cycle is repeated to maintain a continuous delivery of dry material 10 to the fluidizing conduit 300. Accordingly, portion 4E of FIG. 4 illustrates the same condition as shown in portion 4A of FIG. 4.

Upon exiting the flexible conduit 500, the dry material 10 passes into the fluidizing conduit 300, where it is fluidized within and transported by a pressurized gas stream 20 entering the fluidizing conduit 300 from a separate jet 301. The pressurized gas 20 can be introduced into the fluidizing conduit 300 at any convenient angle. However, it is preferred to introduce the pressurized gas stream from an upstream portion of the fluidizing conduit and as nearly parallel as possible to the longitudinal axis of the fluidizing conduit, i.e., substantially parallel to the ultimate direction of material transport through the fluidizing conduit.

As shown in portion 4F of FIG. 4, a liquid component 30 is introduced through a jet 31 into the fluidized dry material 10 in the fluidizing conduit 300 just upstream of an impingement element M to form a slurry 40 with the dry material 10. The slurry 40 is conveyed through the impingement element M to a constricting element 50, which dispenses the cementitious material 45 in atomized form. The impingement element M can be a static mixer or a nozzle, as previously described.

Chopped lengths of fiberglass roving 80 can be fluidized in a separate air jet 22 downstream of the constricting element 50 and added to the atomized cementitious material 45, as previously described. Alternatively, short lengths of binderless fiberglass fibers 85 can be added with the dry material 10 to the entry port 501 of the conduit 500, as described above.

The flexible conduit 500 is preferably a durable, flexible polymeric tubing, such as Tygon® tubing. Typical tubing diameters include 1" and 1½"; however, the diameter and length of the tubing can be of any dimension which will provide the desired volume of dry material delivery. It is preferred to employ multiple conduits to provide a smooth, uninterrupted material delivery feed to the fluidizing conduit. The use of a greater number of flexible conduits generally will result in a more uniform delivery, of dry material. A typical material mixing and dispensing device according to this embodiment of the invention could include, for example, up to eight flexible conduits arranged in parallel, each feeding into a single fluidizing conduit.

Other configurations of serially arranged receptacles which are isolatable from one another and from ambient conditions to achieve continuous dry material transfer can also be employed.

One advantage of the process of the present invention is that greater material delivery pressures and flow rates can be obtained. Where prior art systems are employed, material delivery pressures are limited to about 15 psi, and material throughput is limited to about 215 cubic feet per minute. In contrast, with the present invention, substantially increased material delivery pressures (i.e., up to 100 psi or higher) are attainable, and material throughput can exceed 1,700 cubic inches per minute. In addition, higher material delivery pressures enable the addition of short lengths of binderless fiberglass fibers 85 as a dry material to the first receptacle, as well as to the atomized cementitious material 45 after it exits the constricting element 50.

Figure 2:
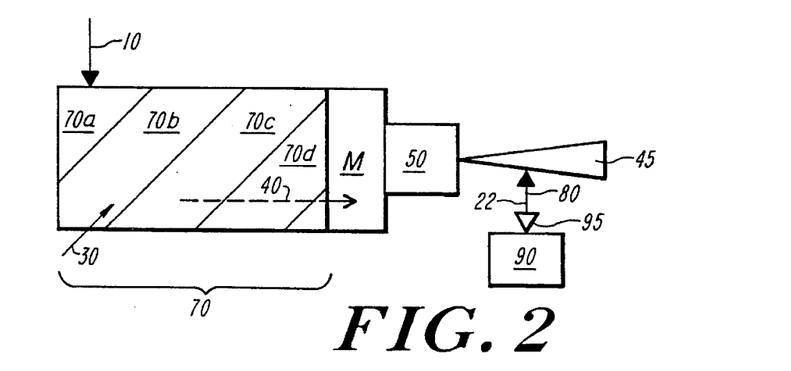
Figure 3:
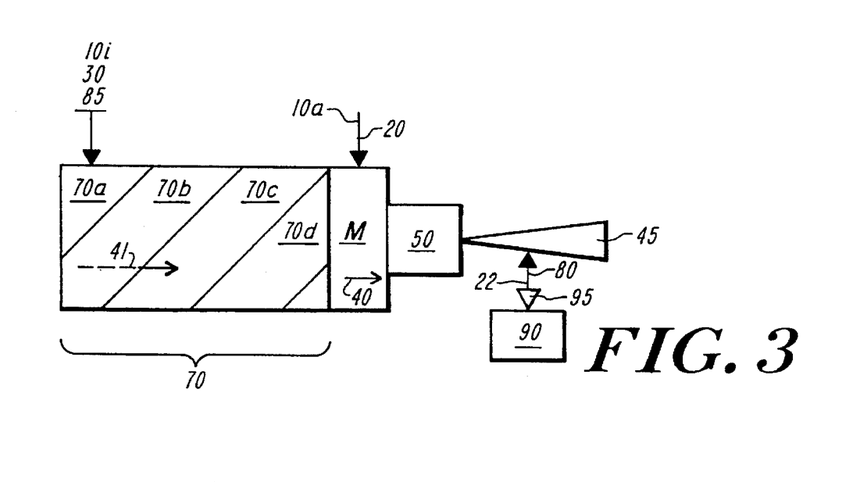

FIGS. 2 and 3 illustrate an alternative embodiment of the invention, in which a cavity pump is used to transport the dry component 10 and the slurried material 40 and to provide substantially increased material delivery pressures. A cavity pump has a power-driven rotating element, or rotor, and a stationary element, or stator, which are structurally complementary to one another. In one embodiment, the rotor has a single helix shape and the stator has a double helix shape. In addition, the stator and rotor are typically made of different materials, the rotor typically being made of a metallic material and the stator being made of a more resilient material, such as an elastomer. The rotor and stator mate in an interference or compression fit. This close fit between the rotor and stator creates a series of temporary, or transient, cavities between the vanes of the rotor as it rotates and moves linearly within the stator. Pumping action occurs when the rotor turns eccentrically within the stator. Generally a liquid or slurry enters the cavity formed at the pump inlet and progresses linearly through the pump with movement of the rotor to the pump outlet. The resulting non-pulsating output flow is directly proportional to the speed of the rotor.

FIG. 2 illustrates one process of the invention in which a cavity pump 70 is used. In this embodiment a cavity pump 70 having multiple transient cavities 70a–70d is employed to mix and transport the dry material 10 and the slurried material 40 to an impingement element M to be mixed before passing through a constricting element 50 to be atomized. The dry component 10 is added to the inlet cavity 70a of the pump and is tumbled as the rotor moves through the stator. The liquid component 30, which can be an aqueous phosphate solution as described above, is introduced into one or more of the internal cavities 70b, 70c in the cavity pump 70 at a sufficient pressure, typically from about 50 to 70 psi, to avoid ejection of the liquid 30 from the cavity. The slurry 40 is then pumped through an impingement element M for further blending as described in connection with the previous embodiments. The slurry 40 is then pumped through a constricting element 50, such as a nozzle or other reduced diameter orifice, to be dispensed in atomized form 45.

The cavity pump 70 preferably has at least four interior transient chambers.

As in the process described above, chopped fiberglass roving 80 can be added to the atomized cementitious material 45 from a separate nozzle 95 downstream from the constricting element 50. Alternatively, preselected short lengths of binderless fiberglass fibers 85 can be included in the dry material 10 that is added to inlet cavity 70a.

In an alternative embodiment of this process, illustrated in FIG. 3, inactive dry material 10i comprising predetermined amounts of silicon dioxide and preselected lengths of binderless fiberglass fibers 85 can be mixed with the liquid component 30 outside of the cavity pump 70 and then introduced as a first mixture 41 into the cavity pump. The cavity pump 70 pumps the first mixture 41 to an impingement element M. Active dry material 10a, comprising predetermined amounts of magnesium oxide, calcium carbonate and one or more additional metallic oxides as previously described, is fluidized in pressurized gas stream 20 and introduced to the impingement element M to form a slurry 40. The resulting slurry 40 is then pumped through the impingement element M and through a constricting clement 50 to be mixed and atomized, as previously described. Chopped fiberglass roving 80 can be added to the atomized cementitious material 45 as described above.

The dry material 10 and the slurry 40 can be pumped through the cavity pump at pressures of up to 100 psi and flow rates of up to about 3,456 in³/min.

The following non-limiting example is presented.

EXAMPLE

The following raw materials were provided in the proportions indicated. All amounts are given in parts by weight.

|  | Formulation I | Formulation II | Formulation III |
|---|---|---|---|
| Silicon dioxide | 100 | 40 | 30 |
| Magnesium oxide | 15 | 15 | 30 |
| Monometal phosphate (aq) (50% conc.) | 40 | 80 | 120 |
| Aluminum oxide | 6 | 3 | 12 |
| Iron oxide | 2 | 1 | 4 |
| Calcium oxide | 4 | 2 | 8 |
| Potassium oxide | 2 | 1 | 4 |
| Titanium dioxide | — | 1 | — |
| Sodium oxide | — | — | 1 |
| Calcium carbonate | — | 1 | — |
| Fiberglass | 8 | — | 15 |

Figure 1:
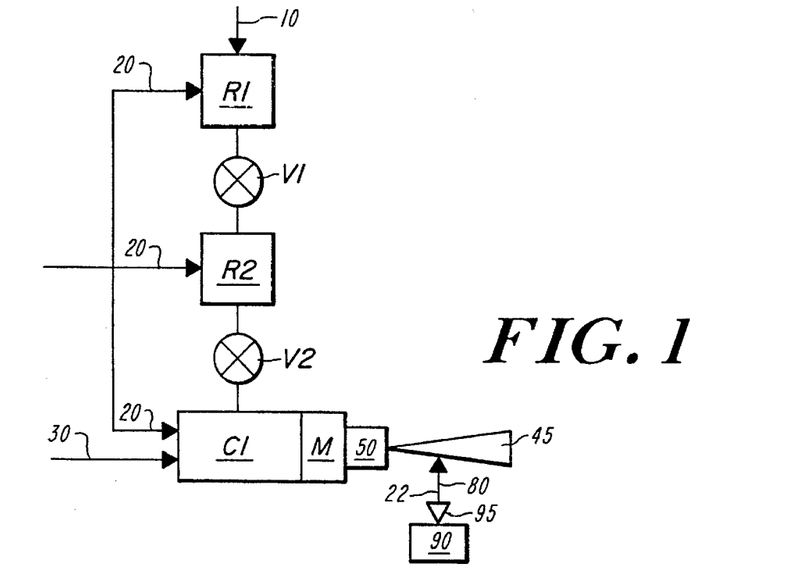

Each of Formulations I–III was processed using the dual receptacle process described above with respect to FIG. 1. The following were utilized in the process:

Air pressure in fluidizing conduit: 35 psi

Dry material flow rate to fluidizing conduit: 648 in³/min

Fluidizing conduit inner diameter: 1 inch

Liquid jet pressure: 60 psi

Liquid flow rate: 162 in³/min

Liquid jet: 7/64 inch

Impingement element M: Static mixer with 1 inch bore

Constricting element 50: Nozzle with 3/4 inch orifice

The material was sprayed onto test panels and reached full cure within 1/2 to 2 minutes after being sprayed.

Formulation I produced a cementitious material with a specific gravity of 1.7 and a compressive strength of about 5000 psi. This formulation is useful, for example, as a replacement material for filled polyester resins used, for example, in the manufacture of molded shower units and the like. Formulation II produced a foam-like, lightweight structure with a specific gravity of 0.8 and compressive strength of about 700–800 psi. This formulation is useful, for example, in applications requiring fire-resistant and/or insulative structures such as panels, walls, and the like. Formulation III produced a high-strength cementitious material with a specific gravity of 2.0 and a compressive strength of about 30,000 psi. This formulation is useful, for example, in applications requiring the manufacture of high-strength structural shapes.

Having now described a few embodiments of the invention, it should be apparent to those skilled in the art that the foregoing is thereby illustrative and not limiting, having been presented by way of example only. Numerous modifications and other embodiments are within the scope of one of ordinary skill in the art and are contemplated as falling within the scope of the invention as defined by the appended claims.

What is claimed is:

1. A continuous process for making a sprayable, rapid setting cementitious material, comprising the steps of:

a) adding a dry component to a first receptacle in fluidic communication with and disposed upstream of a second receptacle, the first receptacle being isolated from the second receptacle during addition of the dry component to the first receptacle;

b) isolating the first receptacle from ambient conditions forming a closed system;

c) allowing the first and second receptacles to reach a substantially uniform pressure by introduction of a pressurized gas to each of the first and second receptacles;

d) permitting the dry component to transfer from the first receptacle to the second receptacle when the first and second receptacles are at substantially equal pressures;

e) continuously delivering the dry component into a fluidizing element in communication with the second receptacle in which the dry component is fluidized within a pressurized gas stream;

f) forming a slurry by introducing to the fluidized dry component an aqueous phosphate solution; and g) mixing and atomizing the slurry to obtain a sprayable, rapid setting cementitious material in the form of an atomized material.

2. The process according to claim 1, wherein the dry component consists essentially of an active portion and an inactive portion, wherein the active portion comprises up to about 50 parts by weight magnesium oxide, and the inactive portion comprises up to about 200 parts by weight silicon dioxide.

3. The process according to claim 2, wherein the active portion further comprises up to about 200 parts by weight of at least one metallic oxide selected from the group consisting of the oxides of calcium, aluminum, iron, potassium, titanium and sodium, and up to about 50 parts by weight calcium carbonate, and wherein the inactive portion further comprises up to about 30 parts by weight of binderless fiberglass fibers.

4. The process according to claim 1 wherein the aqueous phosphate solution is selected from the group consisting of ammonium phosphate, monoaluminum phosphate, monomagnesium phosphate and monocalcium phosphate.

5. The process according to claim 1 wherein the fluidizing element comprises a conduit having a gas entry port for introduction of a gas and a liquid entry port for introduction of a pressurized liquid.

6. The process according to claim 1 wherein the fluidizing element is in fluid communication with the first and second receptacles to establish a substantially uniform pressure in the first and second receptacles and in the fluidizing element.

7. The process of claim 1 further including the step of adding a fiberglass material to the atomized material.

8. A continuous process for making a sprayable, rapid setting cementitious material, comprising the steps of a) adding a dry component to an inlet port of a cavity pump and operating the cavity pump to transport the dry component through the pump;

b) separately introducing an aqueous phosphate solution to a portion of the dry component in an interior chamber in the cavity pump;

c) transporting the dry material and the solution to an impingement device to form a slurry; and d) mixing and atomizing the slurry to obtain a sprayable, rapid setting cementitious material in the form of an atomized material.

9. The process according to claim 8, wherein the dry component consists essentially of an active portion and an inactive portion, wherein the active portion comprises up to about 50 parts by weight magnesium oxide, and the inactive portion comprises up to about 200 parts by weight silicon dioxide.

10. The process according to claim 9, wherein the active portion further comprises up to about 200 parts by weight of at least one metallic oxide selected from the group consisting of the oxides of calcium, aluminum, iron, potassium, titanium and sodium, and up to about 50 parts by weight calcium carbonate, and wherein the inactive portion further comprises up to about 30 parts by weight of binderless fiberglass fibers.

11. The process according to claim 9 wherein the aqueous phosphate solution is selected from the group consisting of ammonium phosphate, monoaluminum phosphate, monomagnesium phosphate and monocalcium phosphate.

\* \* \* \* \*

UNITED STATES PATENT AND TRADEMARK OFFICE
CERTIFICATE OF CORRECTION

PATENT NO. : 5,494,708
DATED : February 27, 1996
INVENTOR(S) : Henry L. Chess, Jr.

It is certified that error appears in the above-identified patent and that said Letters Patent is hereby corrected as shown below:

On the title page:

Col. 2 (Atty name): "William C. Geary, III" s/be --William C. Geary III--

|  | Reads | Should Read |
|---|---|---|
| Col. 5, line 26: | or | of |
| Col. 5, line 34: | or | of |
| Col. 8, line 62: | alter | after |
| Col. 10, line 39: | delivery, of | delivery of |
| Col. 12, line 47: | thereby | merely |

Signed and Sealed this

Eleventh Day of July, 2000

Attest:

Q. TODD DICKINSON

*Attesting Officer*  *Director of Patents and Trademarks*